Patented Dec. 22, 1953

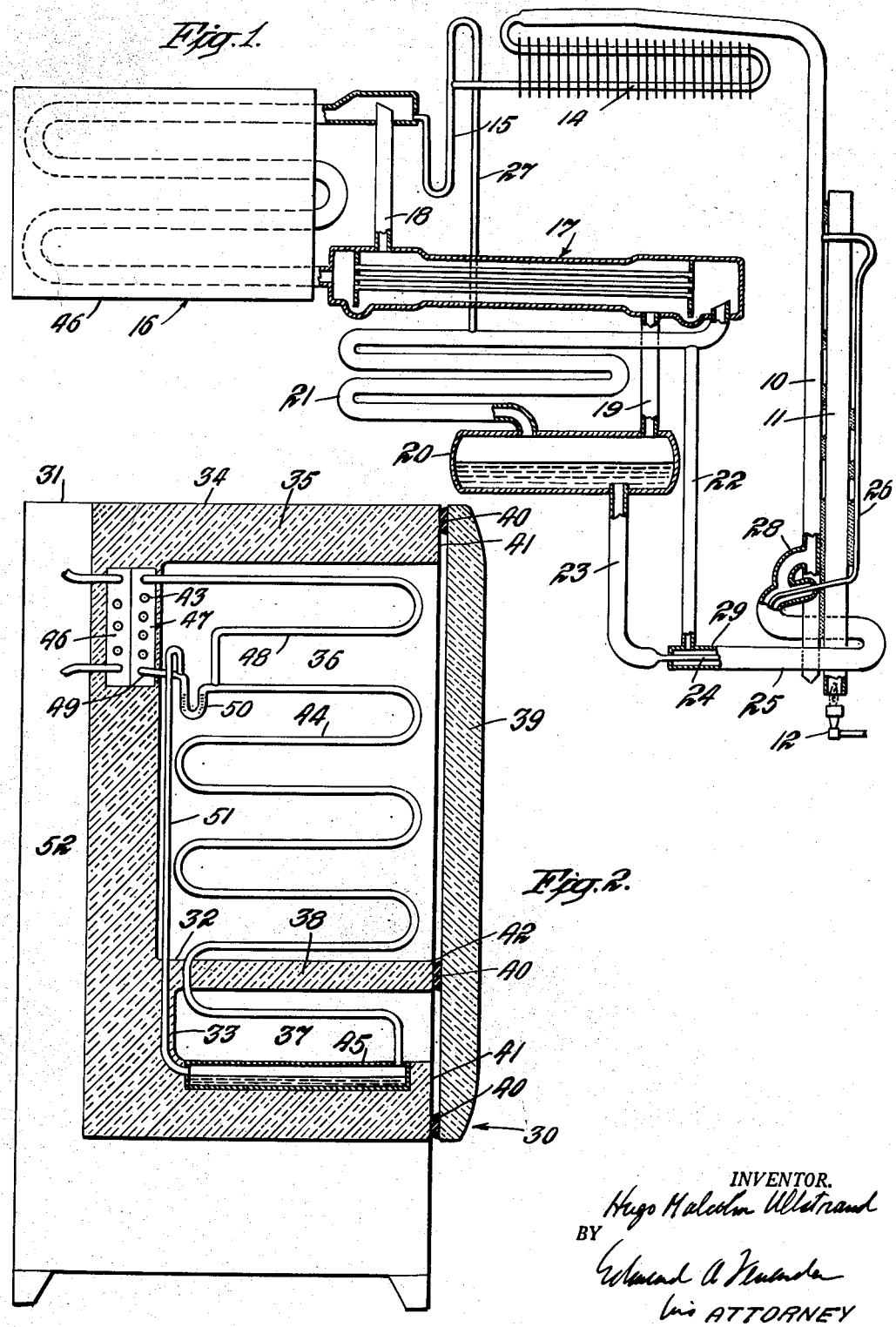

2,663,159

UNITED STATES PATENT OFFICE 2,663,159

REFRIGERATOR EMPLOYING SECONDARY REFRIGERATION SYSTEM

Hugo Malcolm Ullstrand, Stockholm, Sweden, assignor to Aktiebolaget Elektrolux, Stockholm, Sweden, a corporation of Sweden Application April 26, 1950, Serial No. 158,119

Claims priority, application Sweden July 12, 1949

13 Claims. (Cl. 62—95)

My invention relates to refrigeration, and more particularly concerns cooling of a thermally insulated interior of a refrigerator with the aid of a secondary refrigeration system.

It is an object of my invention to provide an improvement for cooling an interior of a refrigerator with the aid of a secondary refrigeration system whereby better distribution of cooling effect may be obtained.

Another object of my invention is to provide an improvement for transmitting cooling effect from a primary evaporator or cooling element to the interior of a refrigerator whereby a single secondary refrigeration system can be employed to transmit such cooling effect over a wide temperature range including temperatures above and below the freezing temperature of water.

A further object of my invention is to reproduce a temperature gradient in the secondary evaporator of a heat transfer system which is generally like the temperature gradient of a primary evaporator with which the heat transfer system is associated.

A still further object is to provide a secondary refrigeration system for transferring cooling effect over a wide temperature range from an evaporator or cooling element having a temperature gradient and forming a part of an absorption refrigeration system employing evaporation of refrigerant fluid in the presence of an inert gas or auxiliary agent.

The above and other objects and advantages of the invention will be better understood from the following description taken in connection with the accompanying drawing forming a part of this specification, and in which Fig. 1 is a view more or less diagrammatically illustrating an absorption refrigeration system of the inert gas type to which the invention has been applied; and Fig. 2 is a vertical sectional view of a refrigerator and cooling element therefor which embodies the invention and is associated with a refrigeration system like that shown in Fig. 1.

In Fig. 1 I have shown an absorption refrigeration system of a uniform pressure type which is well known in the art and in which an inert pressure equalizing gas is employed. Such a refrigeration system comprises a generator or boiler 10 containing a refrigerant, such as ammonia, in solution in a body of absorption liquid, such as water. Heat may be supplied to the boiler 10 from a heating tube or flue 11 thermally connected therewith, as by welding. The heating tube 11 may be heated in any suitable manner, as by a liquid or gaseous fuel burner 12, for example, which is adapted to project its flame into the lower end of the tube.

The heat supplied to the boiler 10 and its contents expels refrigerant vapor out of solution, and the vapor thus generated flows to an air-cooled condenser 14 in which it is condensed and liquefied. Liquid refrigerant flows from condenser 14 through a conduit 15 into a cooling element 16 in which it evaporates and diffuses into an inert pressure equalizing gas, such as hydrogen, which enters the lower part thereof from a gas heat exchanger 17. Due to evaporation of refrigerant fluid into inert gas, a refrigerating effect is produced, as will be explained more fully hereinafter.

The rich gas mixture of refrigerant vapor and inert gas formed in cooling element 16 flows from the upper part thereof through a conduit 18, gas heat exchanger 17, conduit 19 and absorber vessel 20 into the lower part of an absorber coil 21. In absorber coil 21 the rich gas mixture flows countercurrent to downwardly flowing absorption liquid which enters through a conduit 22. The absorption liquid absorbs refrigerant vapor from inert gas, and inert gas weak in refrigerant flows from the upper part of absorber coil 21 in a path of flow including the gas heat exchanger 17 into the lower part of cooling element 16.

The circulation of gas in the gas circuit just described is due to the difference in specific weight of the columns of gas rich and weak, respectively, in refrigerant vapor. Since the column of gas rich in refrigerant vapor and flowing from cooling element 16 to the absorber coil 21 is heavier than the column of gas weak in refrigerant vapor and flowing from absorber coil 21 to cooling element 16, a force is produced or developed within the system for causing circulation of gas in the manner described.

Absorption solution flows downwardly through coil 21 into the absorber vessel 20 and such solution, which is enriched in refrigerant, passes from the vessel through a conduit 23 and an inner passage or pipe 24 of liquid heat exchanger 25 into the lower end of a vapor lift pipe or tube 26 which is in thermal exchange relation with the heating tube 11, as by welding. Liquid is raised by vapor-liquid lift action through pipe 26 into the upper part of boiler 10. Refrigerant vapor expelled out of solution in boiler 10, together with refrigerant vapor entering through pipe 26, flows upwardly from the boiler to the condenser 14, as previously explained.

The outlet end of condenser 14 is connected by an upper extension of conduit 15 and a conduit 27 to a part of the gas circuit, as to the upper part of absorber coil 21, for example, so that any inert gas which may pass through the condenser 14 can flow into the gas circuit. The absorption liquid from which refrigerant vapor has been expelled flows from the boiler 10 through a connection 28, an outer pipe or passage 29 of the liquid heat exchanger 25 and conduit 22 into the upper part of the absorber coil 21. The circulation of absorption solution in the liquid circuit just described is effected by raising of liquid through pipe 26.

In order to simplify Fig. 1, the cooling element 16 has been illustrated apart from a household refrigerator. It has already been proposed to employ cooling elements of absorption refrigeration systems like that just described to transmit cooling effect to the interior of a refrigerator cabinet with the aid of a secondary refrigeration system. In such known arrangements it had usually been the practice to transmit cooling effect to the interior of the cabinet from a cooling element or evaporator section of a primary refrigeration system which operates at a temperature above the freezing temperature of water, so that food preservation may be effected without dehydration.

In accord with my invention cooling effect is transmitted from cooling element 16 to the interior of a household refrigerator 30 in such a manner that a single secondary refrigeration system can be advantageously employed to transmit cooling effect throughout a wide temperature range below and above the freezing temperature of water. As shown in Fig. 2, the household refrigerator 30 comprises a cabinet 31 having inner metal shells 32 and 33 arranged to be supported within an outer metal shell 34 and insulated with any suitable insulating material 35.

The inner metal shells 32 and 33 define thermally insulated storage compartments 36 and 37, respectively, which are located one above the other and separated by a horizontal insulated partition 38. Access may be had to the compartments 36 and 37 through a door 39 which is hinged to the front of the cabinet 31, a gasket 40 being provided on the door to form an airtight seal when the door is closed and the gasket contacts the front marginal portions 41 and 42 of the cabinet 31 and horizontal partition 38, respectively.

The secondary refrigeration system of the invention, which also may be referred to as a "secondary heat transfer system," comprises a condenser or condensation portion 43 in the form of a looped coil, an evaporation portion which includes a looped coil 44 and vessel 45, and connections between these parts which will be described presently. The cooling element 16 of the absorption refrigeration system described above, which may be referred to as the "primary cooling element," is arranged in good heat conductive relation with the condensation portion 43 of the secondary refrigeration system. This may be accomplished in any suitable manner, and, by way of example, the cooling element 16 and condensation portion 43 are embedded in metal castings 46 and 47, respectively, which can be maintained in good thermal contact with one another by suitable resilient means, not shown.

As described above, liquid refrigerant is conducted to primary cooling element 16 for downward gravity flow therethrough. Inert gas flows upwardly through the cooling element 16 in counterflow to liquid refrigerant. The refrigerant fluid evaporates and diffuses into the inert gas to produce a cooling or refrigerating effect which is transmitted to the condensation portion 43 of the secondary refrigeration system.

Since the inert gas flows upwardly through the vertically extending cooling element 16, the gas in the lower part thereof contains a lesser amount of refrigerant vapor than the gas in the upper part thereof. The partial vapor pressure of the refrigerant is a gradient, so that the temperature of liquid refrigerant in the cooling element 16 is also a gradient, the evaporating temperature of liquid being lower in the bottom part of the cooling element 16 and increasing in the upward direction of flow of the inert gas.

In order to utilize the temperature gradient of the primary cooling element 16 most advantageously for transmitting cooling effect to the interior of refrigerator 30, the secondary refrigeration system is charged not only with a suitable volatile refrigerant or heat transfer fluid but also with a relatively dense or heavy non-condensible or inert gas, so that the refrigerant vapor pressure and temperature corresponding thereto will vary throughout the secondary evaporation portion from the extreme upper part of coil 44 to the vessel 45 which communicates with the lower end of such coil.

In a manner which will be described presently, the volatile heat transfer fluid evaporates within coil 44 and vessel 45 and takes up heat thereby transmitting cooling effect and cooling the compartments 36 and 37. The vapor flows upwardly through coil 44 and conduit 48 into the upper part of the secondary condenser 43, and the vapor is cooled and condensed by the primary cooling element 16. From the secondary condenser condensate flows through a connection 49 into a U-shaped liquid trap 50. The condensate passes from liquid trap 50 into the evaporation portion of the secondary refrigeration system, and in so doing passes downwardly by gravity flow through coil 44 and collects in vessel 45.

The dense non-condensible or inert gas contained in the secondary refrigeration system passes from the connection 49 through a conduit 51 whose lower end is connected to vessel 45. A suitable dense or inert gas is employed which is appreciably heavier than the vapor of the heat transfer fluid, so that such dense gas will naturally pass downwardly in conduit 51. By way of example, ammonia or methyl chloride may be selected as the secondary refrigerant or volatile heat transfer fluid and sulfur hexafluoride (SF$_6$) may be selected as the dense and heavy inert gas.

It will now be understood that the secondary refrigerant passes downwardly through coil 44 into vessel 45 while the dense inert gas is introduced into the evaporation portion of the secondary system at the vessel 45 and passes upwardly through coil 44. The secondary refrigerant or volatile fluid evaporates and diffuses into the dense gas and takes up heat thereby abstracting heat from the surroundings. Hence, the dense inert gas in the lower part of the secondary evaporator or evaporation portion contains a lesser amount of vapor of the volatile heat transfer fluid than the inert gas in the upper part thereof. Accordingly, the partial vapor pressure of the volatile heat transfer fluid will be a gradient, so that the temperature of volatile heat transfer fluid in the coil 44 will also be a gradient, the evaporating temperature of the volatile fluid being lower in the vessel 45 and bottom part of coil 44 and increasing in the upward direction of flow of the dense inert gas in the coil 44.

In view of the foregoing, it will now be seen that the secondary refrigeration system of the invention will be capable of transmitting cooling effect throughout the temperature range of the primary cooling element 16, and the temperature stratification in the secondary evaporator formed by the coil 44 and vessel 45 will correspond to the temperature gradient in the primary cooling element 16.

Since the primary cooling element is capable of operating at temperatures below the freezing temperature of water in the lower part thereof and operating at above freezing temperatures in the upper part thereof, the interior of refrigerator 30 can be divided to take advantage of the sub-freezing temperatures produced in the vessel 45 and lower part of coil 44. Hence, the bottom compartment 37 may be employed as the low temperature storage space and may be operated at a sufficiently low temperature to store frozen food packages and produce ice cubes in trays containing water adapted to be frozen.

The upper part of coil 44 which may be operated at a temperature above the freezing temperature of water may be advantageously employed to effect cooling of the upper storage compartment 36. In any event, the storage compartment 36 will be maintained at a higher temperature than the lower compartment 37 and hence will be maintained at a higher humidity. While in Fig. 2 the coil 44 has been diagrammatically illustrated as being disposed within the compartments 36 and 37, it will be understood that in practice the coil 44 may be arranged to abstract heat from the interior of the refrigerator 30 in any suitable manner. For example, the coil 44 may be embedded in the insulation and arranged in good thermal contact with the outer surfaces of the inner liners 32 and 33 defining the storage compartments 36 and 37. The vessel 45 may form the bottom supporting surface of the lower compartment 37 or may be arranged in good thermal contact with the underside of the inner liner defining such lower compartment. The inert gas conduit 51 also is desirably embedded in the insulation 35 and out of direct contact with the inner liners 32 and 33. It will be observed that a rear apparatus compartment 52 is provided in cabinet 31 for housing the primary refrigeration system of Fig. 1.

An important consideration in practicing the invention is the proper selection of an inert gas which is dense and relatively heavy compared to the vapor of the volatile heat transfer fluid. This is so because it is desirable to produce a driving force of high magnitude within the secondary refrigeration system to cause circulation of the inert gas. In the connection 49 the partial vapor pressure of the volatile fluid or secondary refrigerant is relatively low following condensation of such fluid in the secondary condenser 43. Accordingly, the gas passing into the upper end of conduit 51 is of high density and considerably heavier than the gas mixture of inert gas and secondary refrigerant vapor in coil 44. Due to the difference in specific weight of the columns of heavy gas in conduit 51 and the lighter gas mixture in coil 44, a driving force is produced within the secondary refrigerating system for causing circulation of gas in the manner described. This driving force can be intensified by employing tubing for conduit 51 and coil 44 which is of reduced size.

While a single embodiment of the invention has been shown and described, it will be apparent to those skilled in the art that various modifications and changes may be made without departing from the spirit and scope of the invention, as pointed out in the following claims.

What is claimed is:

1. A refrigerator including a cabinet having first and second thermally insulated compartments, a primary evaporator having portions operable at average or mean temperatures above and below the freezing temperature of water, a closed heat transfer system containing refrigerant fluid and a non-condensible gas whose specific weight is greater than that of the refrigerant fluid in vapor phase, said system comprising a condensation section in heat exchange relation with both portions of said primary evaporator and a vaporization section including one portion in thermal relation with said first compartment and another portion in thermal relation with said second compartment, and means comprising said closed heat transfer system for transferring cooling effect from both portions of said primary evaporator to said compartments to maintain one of said compartments at an average or mean temperature below the freezing temperature of water and the other of said compartments at an average or mean temperature above the freezing temperature of water.

2. A refrigerator including a cabinet having several thermally insulated compartments, a primary cooling unit having first and second portions operable at different average temperatures, a closed heat transfer system containing refrigerant fluid and a non-condensible gas whose specific weight is greater than that of refrigerant fluid in vapor phase, said system comprising a condensation section in heat exchange relation with both the first and second portions of said primary cooling unit and a vaporization section having one portion in thermal relation with one of said compartments and another portion in thermal relation with another of said compartments, and means comprising said closed heat transfer system for transferring cooling effect from both the first and second portions of said primary cooling unit to said compartments to maintain one of said compartments at a low average temperature and another of said compartments at a higher average temperature.

3. In a method of transferring cooling effect in which refrigerant fluid is vaporized in a place of vaporization and such vaporized refrigerant is condensed in a place of condensation in heat exchange relation with a source of refrigeration having a gradient temperature and the condensate is returned to the place of vaporization, the improvement which comprises circulating a non-condensible gas through and between said places of vaporization and condensation in a closed circuit in one portion of which vaporized refrigerant accompanies the non-condensible gas and such gas mixture flows from one region of the place of vaporization to the place of condensation in a path of flow which is in heat exchange relation with successively lower temperature portions of the source of refrigeration, and in another portion of which non-condensible weak in vaporized refrigerant flows from the place of condensation to another region of the place of vaporization for flow therethrough to said one region.

4. In a method of transferring cooling effect in which refrigerant fluid is vaporized in a place of vaporization and such vaporized fluid is condensed in a place of condensation in heat exchange relation with a primary source of refrigeration and the condensate is returned to the place of vaporization, the improvement which comprises flowing condensate formed in the place of condensation to a place of accumulation, overflowing liquid at a place to which condensate flows from a region below the liquid surface level at the place of accumulation, conducting such overflow liquid to the place of vaporization for gravity flow through the latter, circulating a non-condensible gas through and between said place of vaporization and condensation in a closed circuit in one portion of which the non-condensible gas flows upwardly in a vertically extending path of flow in the place of vaporization in the presence of downwardly flowing condensate and in another portion of which non-condensible gas weak in refrigerant flows from the vapor space above the liquid surface level in the place of accumulation to the lower end of the vertically extending path of flow in the place of vaporization.

5. In a method of transferring cooling effect in which liquid refrigerant is vaporized in a place of vaporization and such vaporized refrigerant is condensed in a place of condensation in heat exchange relation with a primary source of refrigeration and the liquid condensate is returned to the place of vaporization, the improvement which comprises circulating between said places of vaporization and condensation and in one direction through each of said places above the liquid surfaces therein a non-condensible gas whose specific weight is greater than that of the refrigerant fluid in vapor phase.

6. The method of transferring cooling effect which comprises flowing a non-condensible gas to one end of a vertically extending path of flow in a place of vaporization, introducing liquid refrigerant to a region of the place of vaporization for flow therethrough without blocking flow of non-condensible gas in said path of flow, vaporizing liquid refrigerant in the place of vaporization in the presence of the non-condensible gas, flowing a mixture of refrigerant vapor and non-condensible gas from the opposite end of said vertically extending path of flow in the place of vaporization to a place of condensation in heat exchange relation with a source of refrigeration so as to liquefy the refrigerant out of the gas mixture, returning non-condensible gas from the place of condensation to said one end of the vertically extending path of flow in the place of vaporization, and flowing liquid refrigerant from the place of condensation to said region at which such liquid is introduced to the place of vaporization for flow therethrough.

7. In combination with a primary source of refrigeration, a secondary cooling system comprising a condenser in heat exchange relation with the primary source of refrigeration and an evaporator, said cooling system being hermetically closed and containing refrigerant fluid and a non-condensible gas whose density is appreciably greater than the refrigerant fluid in vapor phase, said evaporator comprising structure providing an elongated path of flow for fluids, conduit means for conducting liquid refrigerant formed in said condenser to the upper part of said evaporator for gravity flow through the latter, conduit means for conducting non-condensible gas enriched in refrigerant vapor from the upper part of said evaporator to said condenser, and conduit means for separating non-condensible gas weak in refrigerant vapor from liquid formed in said condenser and conducting such separated gas to the lower part of said evaporator for upward flow through the elongated path of flow in the latter.

8. In combination with a primary source of refrigeration, a secondary cooling system comprising a condenser in heat exchange relation with the primary source of refrigeration and an evaporator, said cooling system being hermetically closed and containing refrigerant fluid and a non-condensible gas whose density is appreciably greater than the refrigerant fluid in vapor phase, said evaporator comprising structure providing an elongated path of flow for fluids, a connection including a liquid trap for conducting liquid refrigerant formed in said condenser to the upper part of said evaporator for gravity flow in the latter, conduit means for conducting non-condensible gas enriched in refrigerant vapor from the upper part of said evaporator to said condenser, and means including said liquid trap for separating non-condensible gas weak in refrigerant vapor from liquid formed in said condenser and conducting such separated gas to the lower part of said evaporator for upward flow through the elongated path of flow in the latter.

9. In combination with a primary source of refrigeration, a secondary cooling system comprising a condenser in heat exchange relation with the primary source of refrigeration and an evaporator, said cooling system containing refrigerant fluid and a non-condensible gas, said evaporator comprising structure providing a vertically extending elongated path of flow for fluids, conduit means for conducting liquid refrigerant formed in said condenser to the upper part of said evaporator for gravity flow through the latter, conduit means for conducting non-condensible gas enriched in refrigerant vapor from one end of said evaporator to said condenser, and means for separating non-condensible gas weak in refrigerant vapor from liquid formed in said condenser and conducting such separated gas to the opposite end of said evaporator for flow through the elongated path of flow in the latter, said cooling system being hermetically closed to provide circuits for refrigerant fluid and the non-condensible gas in which circulation of the gas is effected solely due to the varying partial pressure of refrigerant vapor in different parts of the circuit for non-condensible gas.

10. In a refrigerator having a cabinet divided into several compartments at different levels, primary absorption refrigeration apparatus including an evaporator in which refrigerant evaporates in the presence of an inert gas circulating therethrough, such evaporator having a temperature gradient in which successive portions in the direction of gas flow operate at increasingly higher temperature levels, an hermetically closed secondary cooling system comprising a condenser in heat exchange relation with said evaporator and a vertically extending cooling element having a lower portion arranged to abstract heat from one compartment and a higher portion arranged to abstract heat from another compartment at a higher level, said secondary system containing refrigerant fluid and a non-condensible gas whose specific weight is greater than that of the refrigerant fluid in vapor phase, a connection for conducting liquid refrigerant formed in said condenser to said cooling element for gravity flow therethrough in the presence of the non-condensible gas, a connection for conducting a mixture of non-condensible gas and vaporized refrigerant from the higher portion of said cooling element to said condenser and another connection for separating non-condensible gas from liquid formed in said condenser and conducting such separated gas to the lower portion of said cooling element, said condenser being formed and arranged to provide a path of flow for the gas mixture formed in said cooling element in which the gas mixture in the direction of flow comes in heat exchange relation with successively cooler portions of said evaporator.

11. In a refrigerator having a cabinet divided into several compartments at different levels, primary absorption refrigeration apparatus including an evaporator, an hermetically closed secondary cooling system comprising a condenser in heat exchange relation with said evaporator and a vertically extending cooling element having a lower portion arranged to abstract heat from one compartment and a higher portion arranged to abstract heat from another compartment at a higher level, said secondary system containing refrigerant fluid and a non-condensible gas whose specific weight is greater than that of the refrigerant fluid in vapor phase, a connection for conducting liquid refrigerant formed in said condenser to said cooling element for gravity flow therein in the presence of the non-condensible gas, a connection for conducting a mixture of non-condensible gas and vaporized refrigerant from the higher portion of said cooling element to said condenser, and another connection for separating non-condensible gas from liquid formed in said condenser and conducting such separated gas to the lower portion of said cooling element.

12. In a refrigerator having a cabinet divided into several compartments at different levels, primary absorption refrigeration apparatus including an evaporator, a secondary cooling system comprising a condenser in heat exchange relation with said evaporator and a vertically extending cooling element having a lower portion arranged to abstract heat from one compartment and a higher portion arranged to abstract heat from another compartment at a higher level, said secondary system containing refrigerant fluid and a non-condensible gas, a connection for conducting liquid refrigerant formed in said condenser to said cooling element for gravity flow therein in the presence of the non-condensible gas, a connection for conducting a mixture of non-condensible gas and vaporized refrigerant from one end of said cooling element to said condenser and another connection for separating non-condensible gas from liquid formed in said condenser and conducting such separated gas to the other opposite end of said cooling element, said cooling system being hermetically closed to provide circuits for refrigerant fluid and the non-condensible gas in which circulation of the gas is effected solely due to the varying partial pressure of the refrigerant vapor in different parts of the circuit for non-condensible gas.

13. In a method of transferring cooling effect in which liquid refrigerant is vaporized in a place of vaporization and such vaporized refrigerant is condensed in a place of condensation in heat exchange relation with a source of refrigeration and the liquid condensate is returned to the place of vaporization, the improvement which comprises circulating a non-condensible gas in a closed circuit between said places of vaporization and condensation and in one direction through each of said places.

HUGO MALCOLM ULLSTRAND.

References Cited in the file of this patent

UNITED STATES PATENTS

| Number | Name | Date |
| --- | --- | --- |
| 1,923,472 | Baird | Aug. 22, 1933 |
| 1,926,384 | Hull | Sept. 12, 1933 |
| 2,033,554 | Smith | Mar. 10, 1936 |
| 2,044,609 | Hedlund | June 16, 1936 |
| 2,142,828 | Smith | Jan. 3, 1939 |
| 2,261,681 | Ullstrand | Nov. 4, 1941 |
| 2,261,682 | Hedlund | Nov. 4, 1941 |
| 2,261,683 | Kuenzli | Nov. 4, 1941 |
| 2,268,381 | Brace | Dec. 30, 1941 |